US012768956B2

(12) United States Patent
Bietry et al.

(10) Patent No.: US 12,768,956 B2
(45) Date of Patent: Oct. 20, 2026

(54) LIDAR LASER SCANNING SYSTEM

(71) Applicant: Garmin International, Inc., Olathe, KS (US)

(72) Inventors: Joseph R. Bietry, Rochester, NY (US); Robert A. Lewis, Flagstaff, AZ (US)

(73) Assignee: Garmin International, Inc., Olathe, KS (US)

( * ) Notice: Subject to any disclaimer, the term of this patent is extended or adjusted under 35 U.S.C. 154(b) by 515 days.

(21) Appl. No.: 18/494,718

(22) Filed: Oct. 25, 2023

(65) Prior Publication Data

US 2024/0264284 A1 Aug. 8, 2024

Related U.S. Application Data

(60) Provisional application No. 63/482,831, filed on Feb. 2, 2023.

(51) Int. Cl.
*G01S 7/481* (2006.01)

(52) U.S. Cl.
CPC .......... *G01S 7/4817* (2013.01); *G01S 7/4815* (2013.01)

(58) Field of Classification Search
CPC .......... G01S 7/4817; G01S 7/4815
USPC .......... 356/4.01
See application file for complete search history.

(56) References Cited

U.S. PATENT DOCUMENTS 5,140,459 A * 8/1992 Sagan .................... G02B 17/08 359/728
6,288,781 B1 * 9/2001 Lobb .................... G01J 3/14 356/326
8,125,620 B2 2/2012 Lewis
8,994,925 B2 3/2015 Lewis
9,335,403 B2 5/2016 Lewis
9,581,684 B2 2/2017 Lewis
9,658,322 B2 5/2017 Lewis et al.
10,466,343 B2 11/2019 Lewis
10,653,937 B2 5/2020 Lewis et al.
11,550,059 B2 1/2023 Lewis
11,745,082 B2 9/2023 Lewis et al.
2010/0208319 A1 * 8/2010 Kessler .............. G02B 17/0615 359/208.1
2012/0307328 A1 * 12/2012 Kessler .............. G02B 26/105 359/729

(Continued)

OTHER PUBLICATIONS

U.S. Appl. No. 18/494,715, filed Oct. 25, 2023.

*Primary Examiner* — Helal A Algahaim
*Assistant Examiner* — James W. Napier
(74) *Attorney, Agent, or Firm* — Samuel M. Korte; Kathleen D. Fitterling

(57) ABSTRACT

A laser scanner comprising two single-axis MEMS scanning mirrors utilizing an optical relay configuration between the mirrors to eliminate beam displacement on the second mirror is disclosed. The lack of physical beam displacement on the second scanning mirror, independent of the first mirrors' scan angle, eliminates the need to elongate the second mirror to accommodate beam spot movement. This configuration enables the combination and injection of two angularly offset laser beam sources into the horizontal axis mirror to effectively double angular scan coverage. With two or more beams spatially combined and time interleaved, an increased effective scanning rate or an increased number of accumulated pulses per measurement dwell point can be achieved.

20 Claims, 8 Drawing Sheets

(56) References Cited

U.S. PATENT DOCUMENTS

| | | | | |
|---|---|---|---|---|
| 2015/0260831 | A1 | 9/2015 | Lewis | |
| 2019/0261851 | A1* | 8/2019 | Williamson | A61B 3/102 |
| 2021/0088667 | A1 | 3/2021 | Heling et al. | |
| 2021/0227187 | A1* | 7/2021 | Stanley | G02B 17/004 |
| 2023/0296868 | A1* | 9/2023 | Nestorovic | G02B 17/023 356/4.01 |
| 2023/0356060 | A1 | 11/2023 | Lewis et al. | |

* cited by examiner

1000

LIDAR LASER SCANNING SYSTEM

RELATED APPLICATIONS

This non-provisional patent application claims priority benefit, with regard to all common subject matter, of earlier-filed U.S. Provisional Patent Application No. 63/482,831, filed Feb. 2, 2023, and entitled "LIDAR LASER SCANNING SYSTEM." The identified earlier-filed provisional patent application is hereby incorporated by reference in its entirety into the present application.

FIELD

Some embodiments described herein are directed to a lidar scanning system. Specifically, some embodiments are directed to a lidar scanning system with increased angular beam coverage.

BACKGROUND

Compact laser scanners often employ two single-axis mirrors in succession to provide two dimensions of far field coverage. When implementing a raster scan using a silicon micro-electro-mechanical-system (MEMS) mirror, the first element is usually a circular, resonantly actuated mirror with a resonate frequency tuned to cover the rapid scanning, typically broader angular coverage, horizontal sweep axis. A second, larger, linear actuated slow-axis mirror is typically used to cover the narrower vertical axis. With raster scanning, the laser beam sweeps back and forth horizontally while sweeping slowly in the vertical axis to provide a rectangular field of coverage. A small resonate MEMS mirror takes advantage of its high self-resonate frequency to allow both rapid field coverage and larger angular swing while the following linear MEMS mirror provides relatively slow controlled movement of the vertical axis. The second mirror is also typically larger than the first mirror in at least one-axis to allow the beam to move across its surface due to the physical displacement of the beam caused by angular rotation of the first mirror.

When two MEMS mirrors are used in succession, the greater the separation between the mirrors, the more physical travel of the beam on the second mirror due to angular rotation of the first. Thus, it is critical to place the mirrors as close together as practical. It is also desirable that the laser beam entering the second mirror be as close to normal to the mirror surface to minimize scan field distortion.

FIG. 1 illustrates a representative piezo-electric driven MEMS mirror pair from ST-Microelectronics. The small mirror with a 1.1 mm diameter is operated resonantly at a frequency of approximately 27 Khz for +/−28 degrees of optical beam horizontal coverage. The larger linear mirror to the left has a clear aperture of 1.44 mm by 2.45 mm and has a minimum resonate frequency of 700 Hz allowing linear controlled operation up to 400 to 500 Hz.

FIG. 2 shows a representative application of the mirrors of FIG. 1. providing two axis coverage. Here, the laser beam is injected into the smaller horizontal mirror at 20 degrees off-axis followed by the second larger linear vertical axis mirror separated by roughly 1.5 mm. With a 1.5 mm separation between the mirrors, 1.5*tan(28°) or roughly 0.8 mm of beam displacement in each direction can be expected. If we assume the beam has a 0.5 mm radius and is shifted by the 0.8 mm of beam travel, this gives a total beam excursion off axis of 1.3 mm. Given the large mirror's 2.45 mm long axis dimension, we would still expect some light clipping of the beam at the full extent of horizontal mirror angular travel.

FIG. 3 illustrates distortion produced from the scanning mirror pair in the previous example. The angular swing of the resonate horizontal mirror remains constant, but field distortion caused by the mirror geometry causes progressively greater horizontal field flaring towards the top of the field. In projection applications, this flaring is compensated by suppressing laser emission outside the left and right edges of the desired rectangular coverage as shown as a dotted line rectangular region. A small amount of loss along the top and bottom of the field is also observed. Curvature of the raster scan lines within the rectangular region can be compensated electronically by re-mapping the rectangular source field into the distorted projection field.

Because the horizontal axis mirror is operated in a resonant mode, the horizontal axis mirror velocity is sinusoidal, reaching zero at the edges of the scan pattern. The falling velocity moving from the center of field requires compensating the laser firing points for the change in velocity by firing the laser more rapidly at the center of the field and slower at the edges. If the scanner position is given as:

Angular position=28 cos(2*pi*f*t) with f or frequency equal to 28 KHz

With the angular rate the derivative of this function or:

Angular rate=28*2*pi*f sin(2*pi*f*t).

Because the maximum rate of change occurs when sine=1 (center of the field), the max rate is 4.5e6 degrees per second. With a laser transmit minimum burst duration of 125 nsec the result is a maximum angular beam smear in the horizontal axis of 0.55 degrees or close to 10 milliradian (mrad). Unfortunately, the high angular rate of the resonate axis mirror dictates the firing of only a single, shorter laser pulse per scanner measurement location. Even for the shortest single pulse, the horizontal angular smear still exceeds the desired horizontal resolution of 0.5 degrees.

Continuing with the example described above, the use of the larger linear mirror for the horizontal axis resolves the angular smear problem because the scan rate can be reduced by at least a factor of fifty. The linear mirror has a maximum linear driven scan frequency of 500 Hz in comparison to the 27 Khz provided by the resonate mirror. The use of the slower linear mirror improves sensitivity and range by allowing a longer signal integration time at each measurement location and for an increased laser burst width for an additional improvement in receiver sensitivity. The linear mirror has a lower angular swing than the resonantly actuated mirror without the assistance of the mechanical gain obtained by operating the mirror at its natural resonance frequency. The larger mirror provides +/−8 degrees of tilt corresponding to +/−16 degrees of beam steering, which is roughly half that required for the horizontal field of coverage.

A variety of optical configurations have been used historically in two-axis scanning systems to eliminate beam travel on the second scanning mirror. The basic approach diagrammed in FIG. 4 uses a pair of relay lenses placed between the two scanning mirrors.

If each relay is telecentric, the ray bundles will intersect normal to the image plane for rays entering from their respective entrance pupils. If the steering mirrors are placed at their respective entrance pupils, beam steering at the first mirror will converge at the second mirror with only an angle shift, but without axial displacement. Equal focal lengths for the two lens relay system results in no field magnification while different values can result in magnification or de-magnification. The primary limitation of this approach is that for large steering angles the relay elements become much more complex, requiring multiple lens elements to maintain good image quality.

Achieving the large field of coverage in a sufficiently small mechanical envelope required investigating a unique approach. A 1973 patent "Unit Power Imaging Catoptric Anastigmat" (U.S. Pat. No. 3,748,015) by Offner showed the potential to implement the functionality of the two-relay optical system in a much smaller, two element reflective system. The approach relays an object point to a physically separated image point with unity magnification, essentially aberration free using just two spherical mirrors. The limitation of unity magnification eliminated this approach as a method to expand field coverage directly, but it offered the opportunity to eliminate beam walk on the second mirror.

SUMMARY

Embodiments of the present disclosure provide a first embodiment directed to a lidar transmit scanner comprising a catoptric relay assembly comprising an entrance aperture for receiving one or more collimated laser beams, wherein the one or more collimated laser beams are configured along a plane tangent to a line connecting the entrance aperture and an exit aperture and are configured to converge at the entrance aperture. The catoptric relay assembly comprises the entrance aperture and the exit aperture positioned at decentered symmetrical points from an optical axis and coincident to a single point of rotation. The lidar transmit scanner further comprising a convex spherical mirror with a radius of curvature roughly equal to a distance from a front surface of the convex spherical mirror to the single point of rotation, a concave cylindrical optic located approximately halfway between the convex spherical mirror and the single point of rotation, the concave cylindrical optic produced by revolution of a rectangular cross-section around a first vertical axis crossing through two entrance and exit apertures, the concave cylindrical optic comprising a center reflective stripe oriented along a revolution axis between optically transmissive regions of the concave cylindrical optic, the convex spherical mirror and the concave cylindrical optic comprising centers of curvature approximately coincident to a second single point of rotation along a center axis of the convex spherical mirror and the concave cylindrical optic, a horizontal single axis scanning mirror disposed at the entrance aperture and comprising a mirror rotation axis coincident with a second vertical axis established by an entrance aperture location and an exit aperture location, and a vertical single axis scanning mirror disposed at the exit aperture and comprising a vertical single axis scanning mirror rotation axis orthogonal to said horizontal single axis scanning mirror.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments of the disclosure are described in detail below with reference to the attached drawing figures, wherein.

Figure 1:
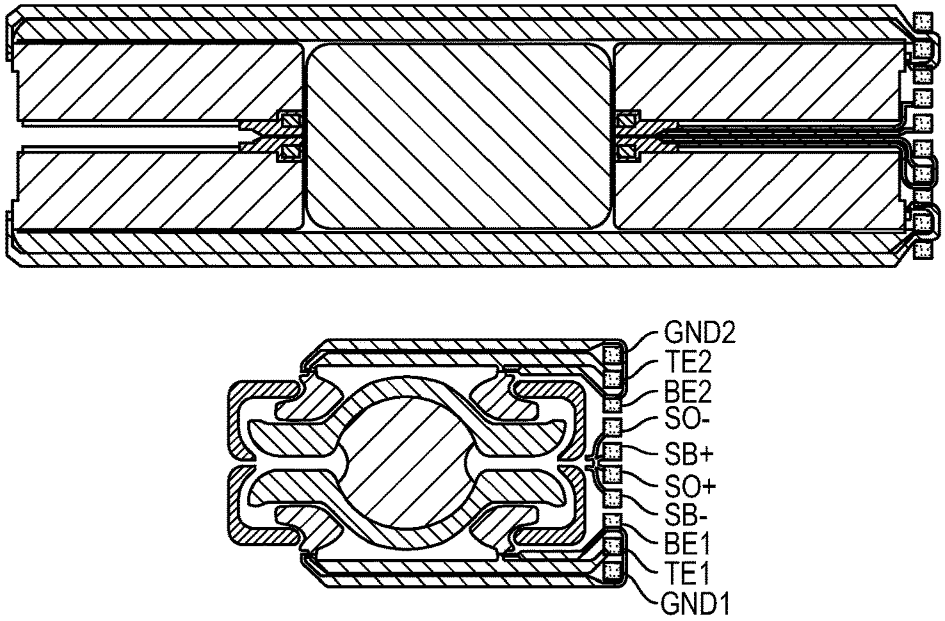
FIG. 1 (Prior Art)
FIG. 1 depicts an arrangement of a MEMS mirror pair known in the art.
Figure 2:
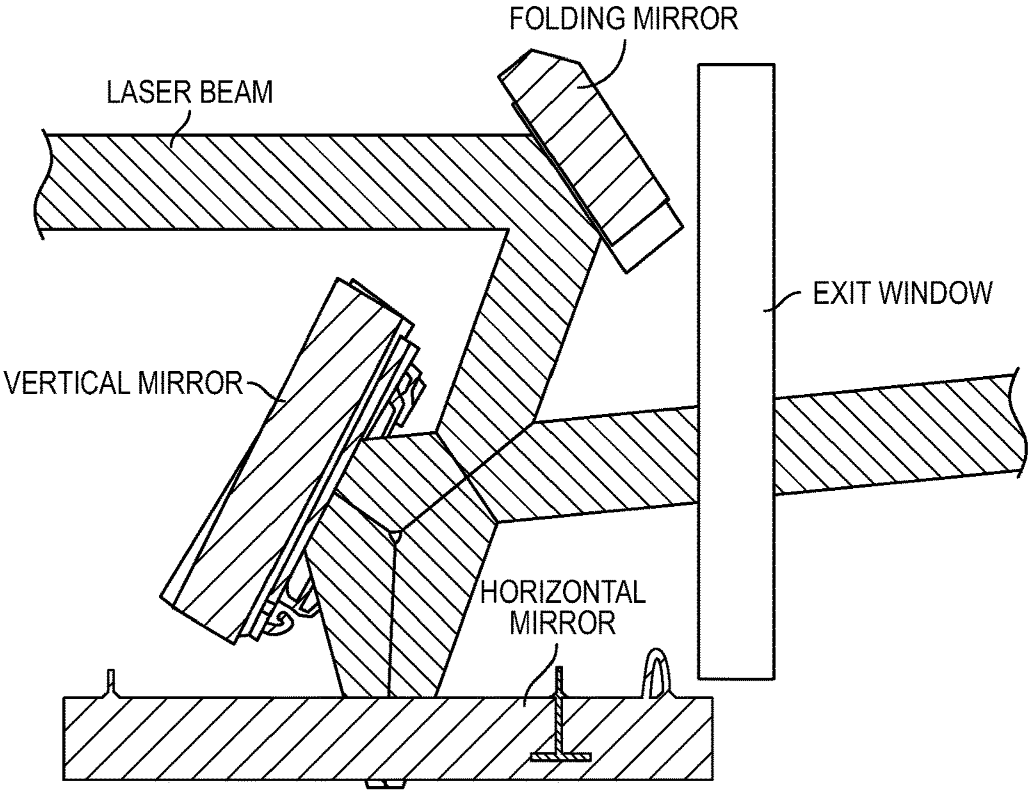
FIG. 2 (Prior Art)
FIG. 2 depicts an exemplary application of the MEMS mirror pair of FIG. 1.
Figure 3:
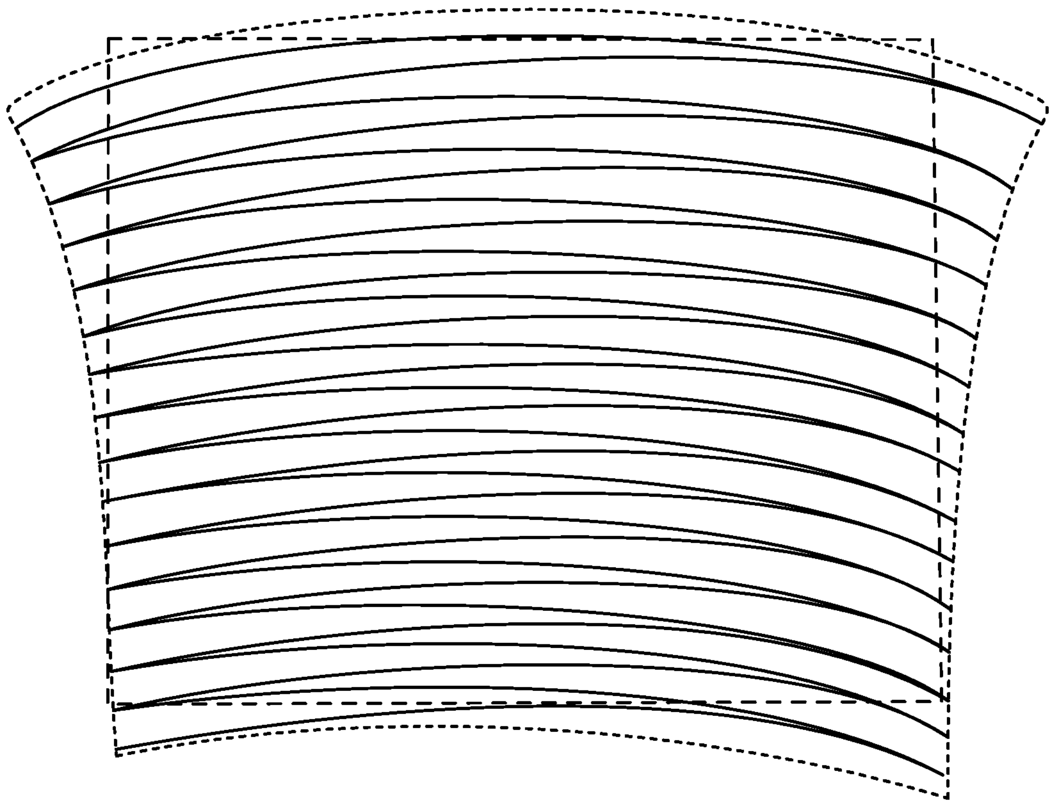
FIG. 3 (Prior Art)
FIG. 3 illustrates exemplary distortion from the application of FIG. 2.
Figure 4:
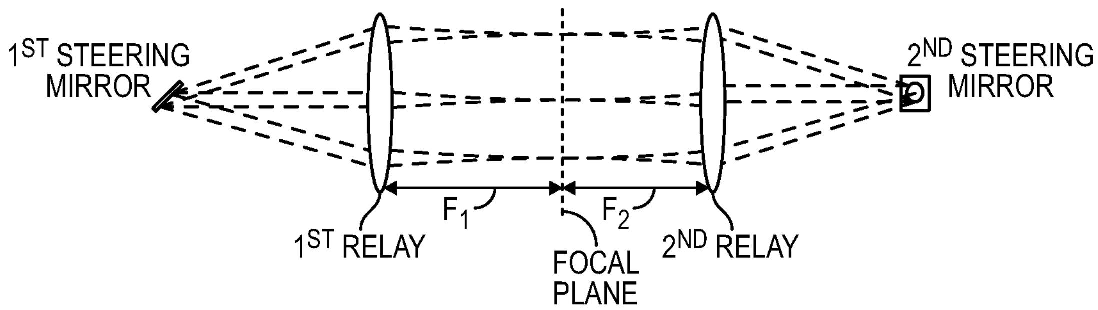
FIG. 4 (Prior Art)
FIG. 4 depicts an exemplary diagram of a pair of lenses between scanning mirror known in the art.

The drawing figures do not limit the disclosure to the specific embodiments disclosed and described herein. The drawings are not necessarily to scale, emphasis instead being placed upon clearly illustrating the principles of the disclosure.

DETAILED DESCRIPTION

The following detailed description references the accompanying drawings that illustrate specific embodiments in which the current disclosure can be practiced. The embodiments are intended to describe aspects in sufficient detail to enable those skilled in the art to practice those embodiments of the disclosure. Other embodiments can be utilized, and changes can be made without departing from the scope of the current disclosure. The following detailed description is, therefore, not to be taken in a limiting sense. The scope of the disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, a lidar laser scanning system is described herein. In some embodiments, a transmit scanner may provide a large scan angle in a horizontal axis and excellent beam quality with a small physical volume of roughly one-half cubic inch. In some embodiments, an Offner relay between first and second MEMS mirrors may be optimized for angular coverage in one axis and the use of two angularly offset beams for double coverage in the horizontal axis. The modified Offner optical relay between the MEMS mirrors may be optimized for angular coverage in one axis. This approach may be used to accommodate a large refractive angular field dictated by the injection of two angularly separated beams into the first MEMS horizontal axis scanning mirror. In some embodiments, the refractive angular field may comprise an anamorphic expansion optic providing unequal expansion in at least two axes.

In some embodiments, a laser scanner comprising two single-axis MEMS scanning mirrors is disclosed. The laser scanner may utilize an optical relay configuration between the mirrors to eliminate beam displacement on the second mirror. The lack of physical beam displacement on the second scanning mirror, independent of the first mirrors' scan angle, may eliminate the need to elongate the second mirror to accommodate beam spot movement. This configuration enables the combination and injection of two angularly offset laser beam sources into the horizontal axis mirror to effectively double angular scan coverage. With two or more beams spatially combined and time interleaved, an increased effective scanning rate or an increased number of accumulated pulses per measurement dwell point can be achieved.

Continuing with above-described example, two or more laser sources may be collimated to produce low divergence beams which are directed with an angular offset in the plane perpendicular to the rotation axis of a single axis scanning mirror. An innovative optical system based on an Offner-type mirror system may project the two angularly deviated beams off of the first scanning mirror onto a second MEMS mirror. At the second mirror, the two deviated beams may converge onto a single spot while preserving the initial angular beam deviation with an added angular offset produced from the rotation of the first steering mirror. Optionally, the optical power of each injected beam can be doubled by the combination of two lasers with orthogonal polarization states. An added benefit of a consistent beam spot location on the second mirror is the option to incorporate a field expansion optic after the second scan mirror to expand the field of coverage in more than one axis.

Figure 5:
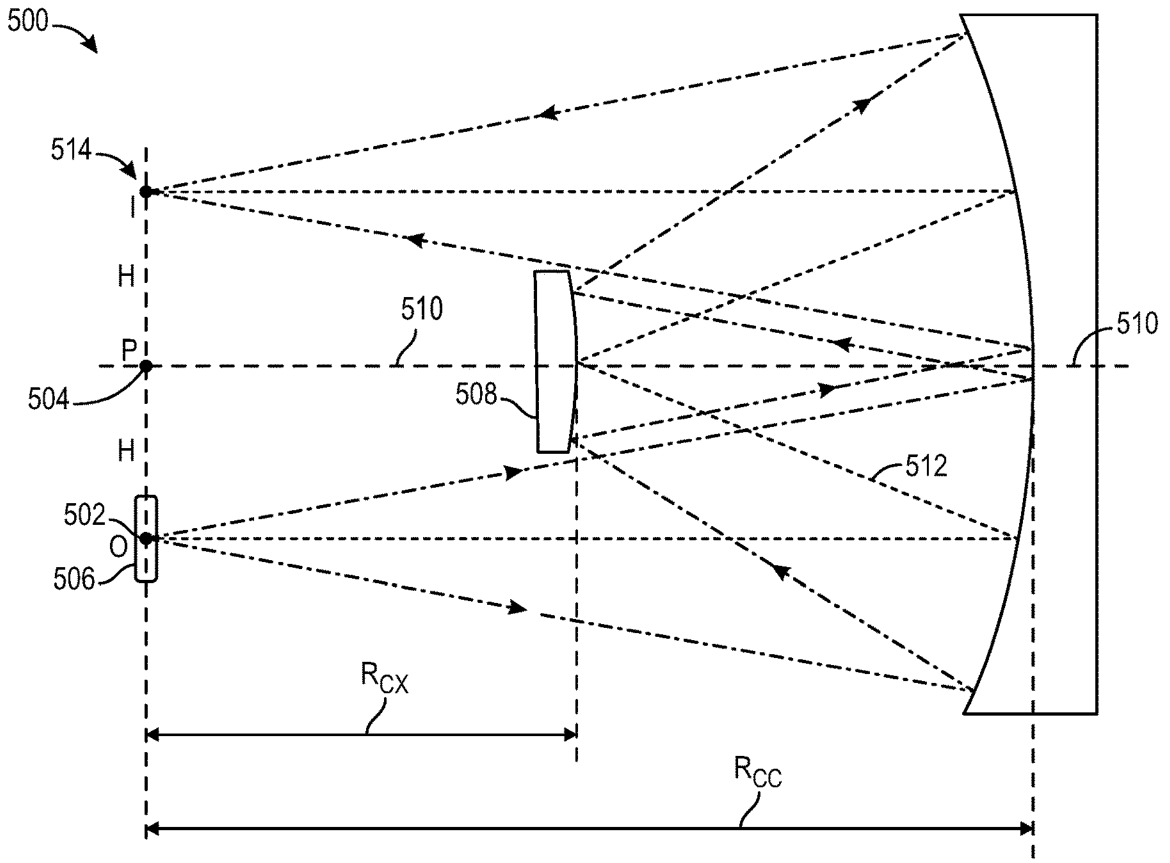
FIG. 5 (Prior Art)
FIG. 5 depicts an exemplary Offner configuration.

FIG. 5 shows a side view diagram of system 500 which in some embodiments may be an Offner configuration as shown. In the exemplary embodiment shown in FIG. 5, the scanning mirrors may be placed at the two vertical positions referenced first point 502 and second point 504 in the diagram. Horizontal scanning mirror 506 placed at first point 502, may project into the Z-Y plane (into the page) causing the formed image in secondary mirror 508 to be right on the center axis 510 of system 500. Ray tracer 512 shows the travel of the horizontal scan.

Figure 6:
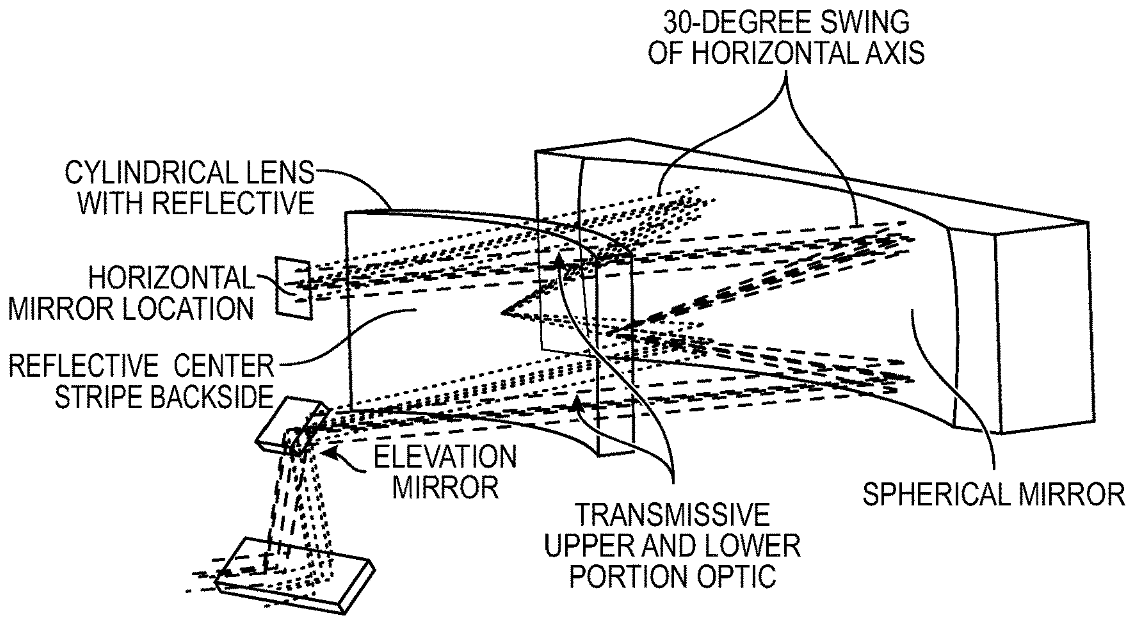
FIG. 6 (Prior Art)
FIG. 6 depicts an alternative configuration of the Offner configuration of FIG. 5 for some embodiments of the current disclosure.

The Offner configuration may be modified by revolving the cross-sections shown in FIG. 1 around a vertical axis crossing through steering mirror locations 514 and first point 502. When the revolving is preformed, secondary mirror 508 may be seen as a cylindrical element with a narrow reflective strip in the center with transmissive regions on either side. FIG. 6 illustrates this configuration from a perspective view. Because system 500 is working with a collimated input beam, secondary mirror 508 may be located at the focus point of the collimated beam and as the secondary mirror 508 is scanned secondary mirror 508 therefore may not need a spherical surface.

Block Diagram Description

Figure 7:
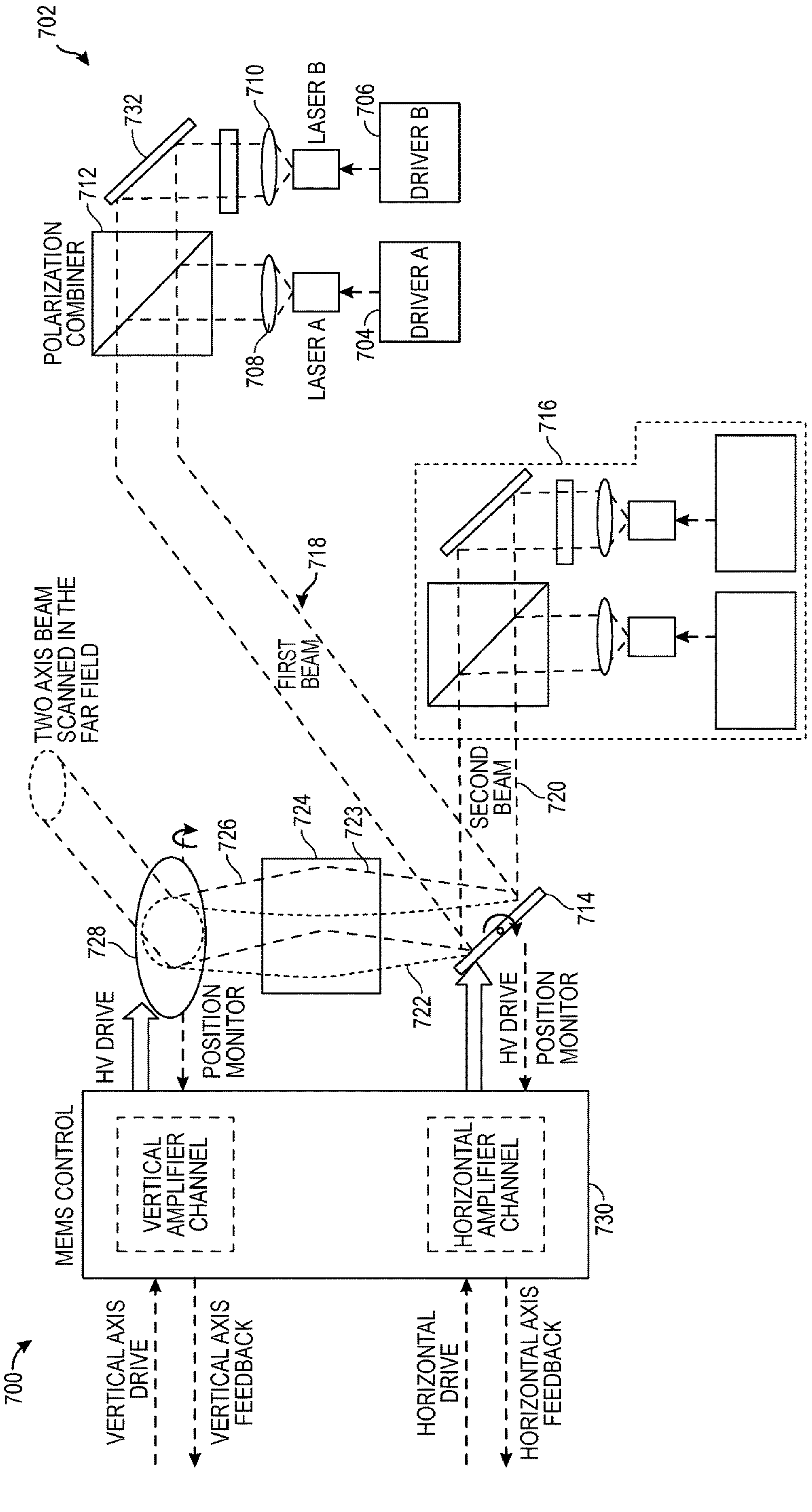
FIG. 7 depicts a scanner diagram for some embodiments of the disclosure.

FIG. 7 depicts a scanner diagram for transmit scanner 700. Beginning at the top right of the figure, a transmit beam generator (i.e., first transmitter 702) comprises combining two single mode laser sources, laser A and laser B to double the transmit power of transmit scanner 700. Lasers A and B may be driven with the same transmit data pattern excitation using a pair of laser driver integrated circuits (first driver 704 and second driver 706) with two separate control differential signals from field programmable gate arrays (FPGA). In some embodiments, first driver 704 and second driver 706 may be collimated laser diodes aligned to produce laser A and laser B. The collimated laser diodes may be configured 90 degrees to one another to produce orthogonal polarization states. In some embodiments, laser A output may be collimated by first lens 708 into a single polarization with, for example, 1 mrad divergence, less than 1 mm diameter beam. Laser A may then be reflected 90 degrees into polarization beam combiner 712 directing the combined beam (first beam 718) towards MEMS horizontal steering mirrors 714. The two collimated laser diodes may achieve orthogonal polarization state using a half-wave polarization retarder plate. In some embodiments, the collimated laser diodes may comprise a center wavelength of between 780 nm and 940 nm or between 820 nm and 830 nm.

In some embodiments, laser B may be similarly collimated by second lens 710, but laser B beam polarization may be rotated 90 degrees by beam rotator 732 to make its beam polarization orthogonal to laser A. Laser B beam may be rotated 90 degrees using a MEMS horizontal steering mirrors 714, passing laser B beam on to polarization beam combiner 712 where laser A and laser B intersect. Laser B beam may pass through polarization beam combiner 712 un-deviated and on to MEMS horizontal steering mirrors 714.

In the diagram, below first transmitter 702, second transmitter 716 may produce a second laser beam (second beam 720) output comprising two combined beams as described in first transmitter 702 above. In some embodiments, second transmitter 716 may be identical or similar to first transmitter 702, such that, second beam 720 is the same or similar to first beam 718. However, in some embodiments, second beam 720 may enter MEMS horizontal steering mirror 714 with an angular offset to first beam 718.

In some embodiments, first beam 718 and second beam 720 may incident on MEMS horizontal steering mirror 714 having an angular offset of approximately 30 degrees. In some embodiments, the angular offset may be more, or less than 30 degrees depending on optimal performance and use case. MEMS horizontal steering mirror 714 may be approximately a 1 mm diameter mirror and may be oriented to deflect the beams symmetrically relative to the center axis of the Offner-type relay optic assembly described above. MEMS horizontal steering mirror 714 can comprise electrostatic, piezoelectric, or magnetic actuation and the drive signal may have a maximum frequency content roughly an octave below the natural resonance of MEMS horizontal steering mirror 714. At maximum deviation, MEMS horizontal steering mirror 714 may rotate approximately +/−8 degrees corresponding to an approximate +/−16-degree maximum angular deviation from nominal beam angle. Reflected beam A 722 and reflected beam B 723 off of MEMS horizontal steering mirror 714 passes through relay optic 724 which reimages transmit beam 726 onto a fixed location on second MEMS mirror (vertical axis MEMS mirror 728), which marks a location of the exit aperture and, in some embodiments, may be a silicon micro-electro-mechanical system mirror. Vertical axis MEMS mirror 728 may be driven with an analog modulated linear ramp or sawtooth scan pattern.

In some embodiments, position feedback may be used for closed loop linearization of mirror movement for any mirrors including MEMS horizontal steering mirror 714 and vertical axis MEMS mirror 728. Because signaling ramp behavior may be relatively slow for the vertical axis, movement of the lidar system platform can produce significant errors in the vertical position of horizontal scan lines, and to a lesser extent skew in the edge of the horizontal, over the duration of each ½ cycle of the linear ramp. To correct for this scanning error at high frequencies, MEMS based Gyro rate information can be integrated in MEMS controller 730 to estimate shifts in the vertical and horizontal frame of reference. In some embodiments, low-cost rate MEMS based accelerometers and/or gyros may be used to monitor orientation.

Offner-Type Relay

Figure 8:
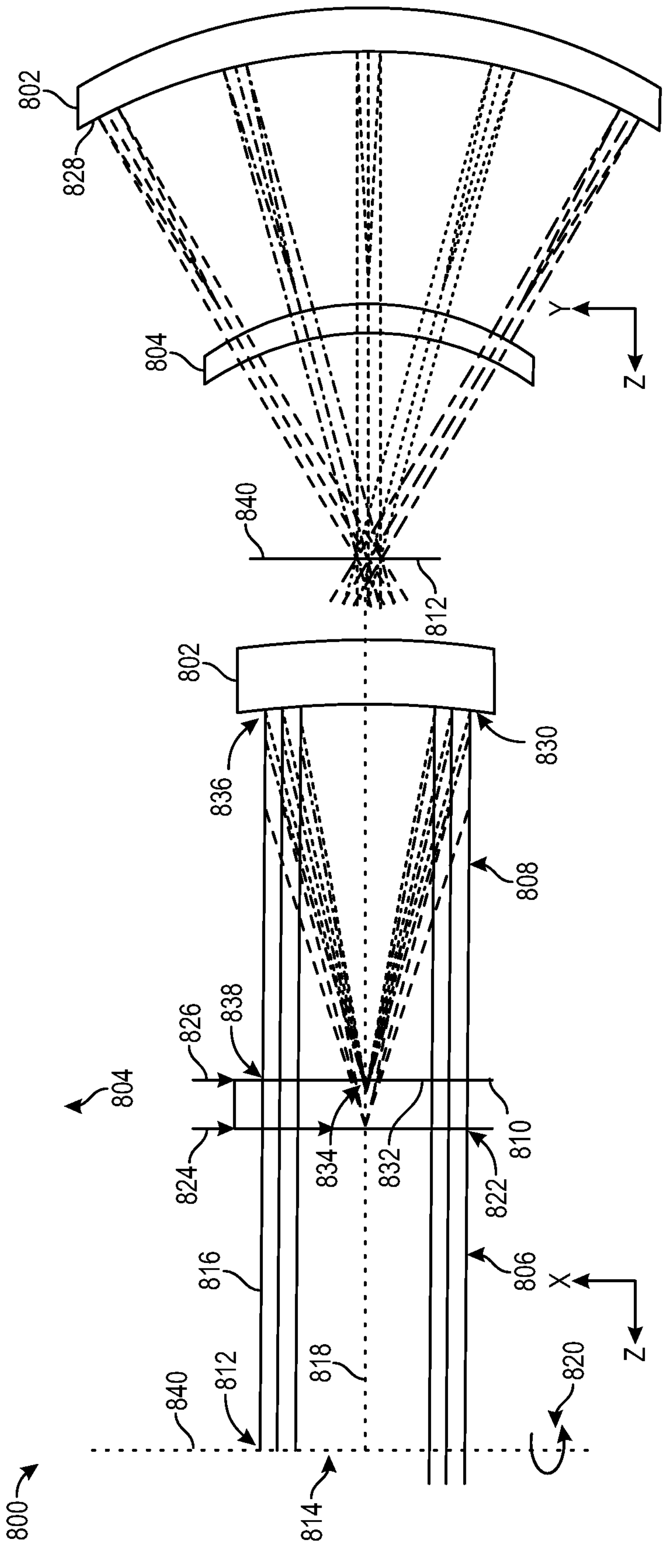
FIG. 8 depicts a raytracing diagram for some embodiments of the disclosure.

FIG. 8 shows a raytracing diagram for the Offner-type unity magnification catoptric system relay assembly (relay assembly 800). In some embodiments, relay assembly 800 comprises convex spherical mirror 802 and concave cylindrical optic 804 with transmissive regions 806, 808 on two sides and center reflective stripe 810. In some embodiments concave cylindrical optic 804 may be produced by revolution of a rectangular cross-section around a first vertical axis crossing through two entrance and exit apertures. Convex spherical mirror 802 and concave cylindrical optic 804 include centers of curvature substantially coincident to a single point of rotation. Concave cylindrical optic 804 may be disposed approximately halfway between the convex spherical mirror and the single point of rotation. Furthermore, a radius of curvature from convex spherical mirror 802 may be roughly equal to a distance from reflector location 836 on a front surface of convex spherical mirror 802 to the single point of rotation (i.e., mirror rotational axis 820). From the left side of FIG. 8, single axis scanning mirror 812 may be placed at entrance aperture 814 such that beam 816 rotates parallel to the center optical axis 818, and symmetrically around mirror rotation axis 820. Beam 816 along center optical axis 818 may pass through a transparent edge region of concave cylindrical optic 804 at location 822. Further, surfaces 824 and cylindrical optic surface 826 may be roughly concentric. Exiting concave cylindrical optic 804, beam 816 may pass through air towards reflective spherical surface 828. Reflecting off of spherical front reflective mirror at mirror reflective point 830, beam 816 (now converging) may follow a reciprocal path when viewed from the Z-Y plane back toward reflective center stripe 832 on cylindrical optic surface 826. The rays form an image at point 834, may diverge back towards reflector location 836, which is symmetric about center optical axis 818, to mirror reflective point 830. Beam 816 at reflector location 836 may become recollimated into roughly parallel rays which pass through cylindrical optic at 838, and on to location 840 where second scanning mirror (adjacent single axis scanning mirror 812) is placed with a rotation axis orthogonal to single axis scanning mirror 812.

In some embodiments, relay assembly 800 comprises beam 816 being highly collimated (low divergence) and entering the system restricted to the z-y plane. This simplification allows the elimination of curvature along the x-axis of the concave cylindrical optic 804 due to the formation of an image rather than the need to pass a converging ray bundle. The small image spot diameter at the point of concave cylindrical optic 804 in relay assembly 800 may practically eliminate the impact of optical power at that point because the amount of curvature is negligible over the diameter of the spot image. Generally, the same can be true along the rotated extruded axis of convex spherical mirror 802, except the surface may need to be tangent to beam 816 to follow a reciprocal path back to the spherical reflector at reflector location 836. The combination of an effectively high f-number of the small diameter beam 816 entering through entrance aperture 814 and the reciprocal path created by the two passes off the spherical primary (convex spherical mirror 802), may effectively eliminate lower order optical aberrations. Residual optical aberration due to the geometrically uncompensated curvature of the extracted cylindrical secondary is corrected by the small amount of power experienced by the beam after passing though the transparent outer edges of the optic (e.g., concave cylindrical optic 804).

Packaging Example

Typical MEMS mirrors can only mechanically scan +/−8 degrees corresponding to +/−16 degrees optical beam swing. A configuration for transmit scanner 900 of the lidar scanning system described herein is shown in a representative mechanical assembly in FIG. 9. Transmit scanner 900 may be packaged in a rectangular envelope suitable for mounting next to the generally rectangular lidar receiver.

Figure 9:
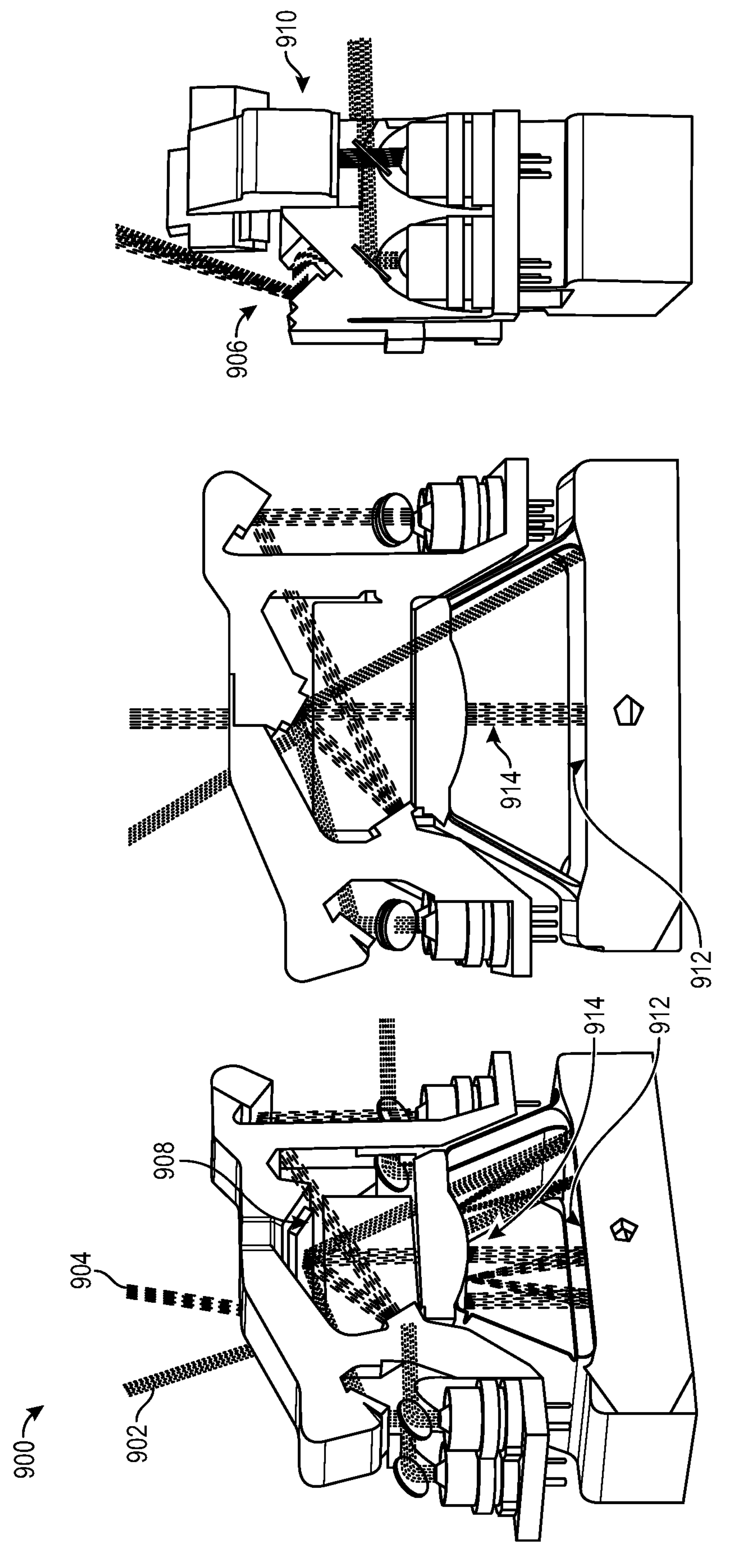
FIG. 9 depicts an exemplary mechanical set up for embodiments of the disclosure.

In some embodiments, as shown in FIG. 9, two 1 mm diameter collimated beams (two beams 902, 904), with +/−15-degree offsets in the X-Z plane may be injected at the location of first horizontal axis mirror 906. Two beams 902, 904, may converge at the elevation mirror 908 with no beam wander. Transmit scanner 900 may provide large sweep angles in the horizontal axis that can be accommodated by extending the extrusion of the two mirror elements in the Z-X plane. This solution eliminates most field distortion of a two-axis mirror scanner and can be modified to accommodate any scan field requirement while preserving excellent beam quality.

The high-power configuration for the transmit scanner 900 is shown with four lasers, two on each side of the unit. Each pair of lasers are modulated together, with one of the two laser packages rotated by 90 degrees so that their polarized outputs can be combined using a reflective polarization combiner. The polarization power combiner film 910 may be mounted at a 45-degree angle directly above the laser to the far right in the side view of FIG. 9. Two beams 902, 904, injected into the first horizontal axis mirror 906 may be deflected by 15 degrees. Because the first beam 902 may already be offset by 15 degrees, the additional 15-degree deflection by first horizontal axis mirror 906 may result in a beam deflection of 30 degrees at the edge of the horizontal field. Conversely, second beam 904 nominally offset at −15 degrees, may be shifted to the center of the field. The side view image (far right) shows both first beam 902 and second beam 904 deflected by the elevation mirror by 15 degrees to the right.

Primary reflector 912 on the bottom of transmit scanner 900 and partially reflective second lens 914 above, may be mounted in a metal frame to maintain relatively tight position and tilt tolerances. In some embodiments, the present glass optics with metal frame can be replaced with snap together plastic assembly. A plastic assembly appears suitable due to the thermal expansion of the supporting structure compensating conveniently for the change in curvature of the mirror surfaces.

Scanning Flexibility

The use of linear scanning mirrors in both axes allows flexibility in the generation of a variety of scan patterns, each optimized for a different field of coverage requirement. For a rectangular uniform illumination field of coverage, a raster scan pattern may be desired. For the raster scan, two or more beams in the horizontal axis may be an advantage. However, once transmit scanner 900 is applied to a specific application, it may be desirable to modify the field pattern, possibly requiring the return to a single laser output beam, thus returning to a square maximum field of coverage.

Figure 10:
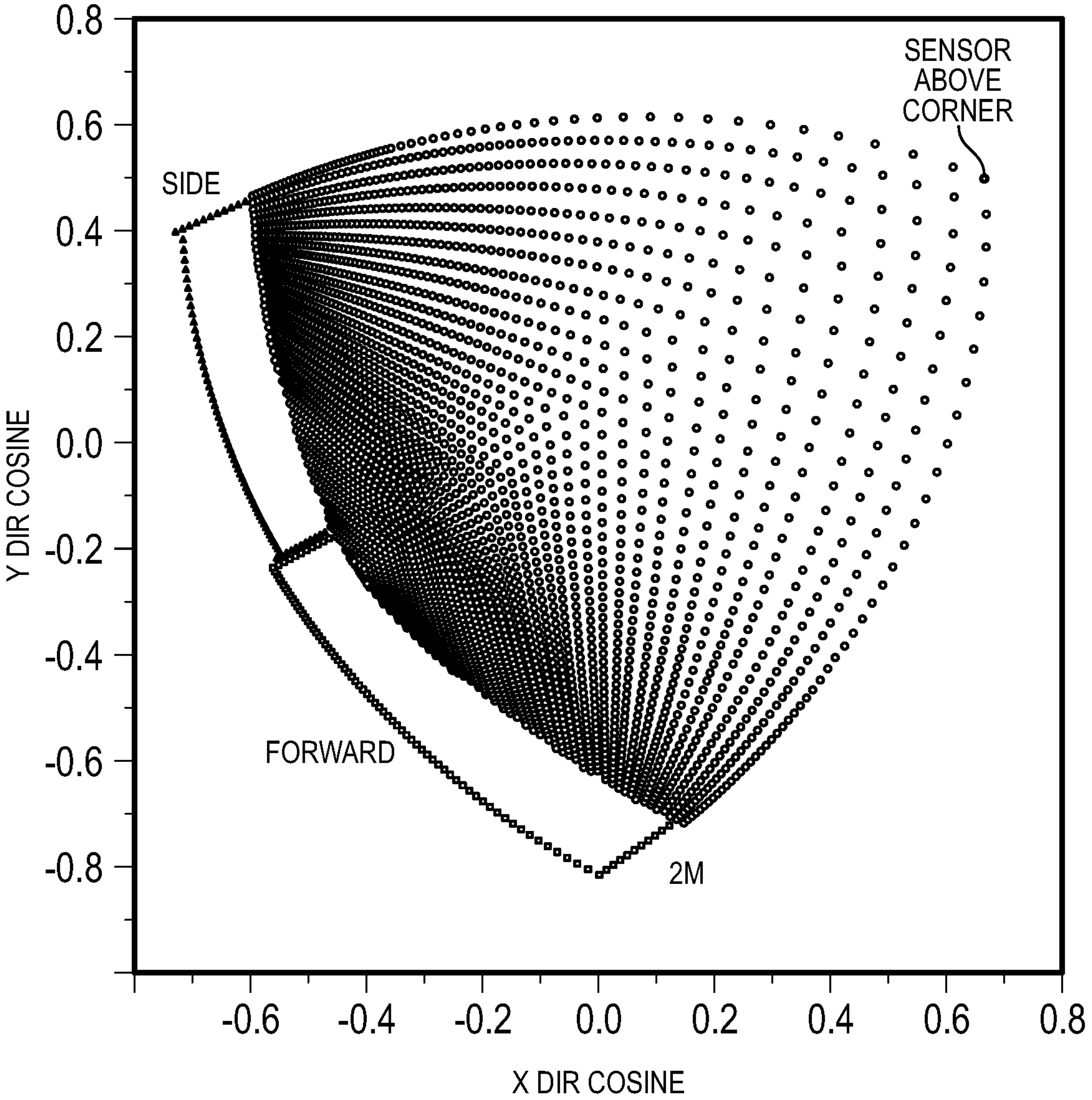
FIG. 10 depicts and exemplary field of coverage of the lidar system.
Figure 11A:
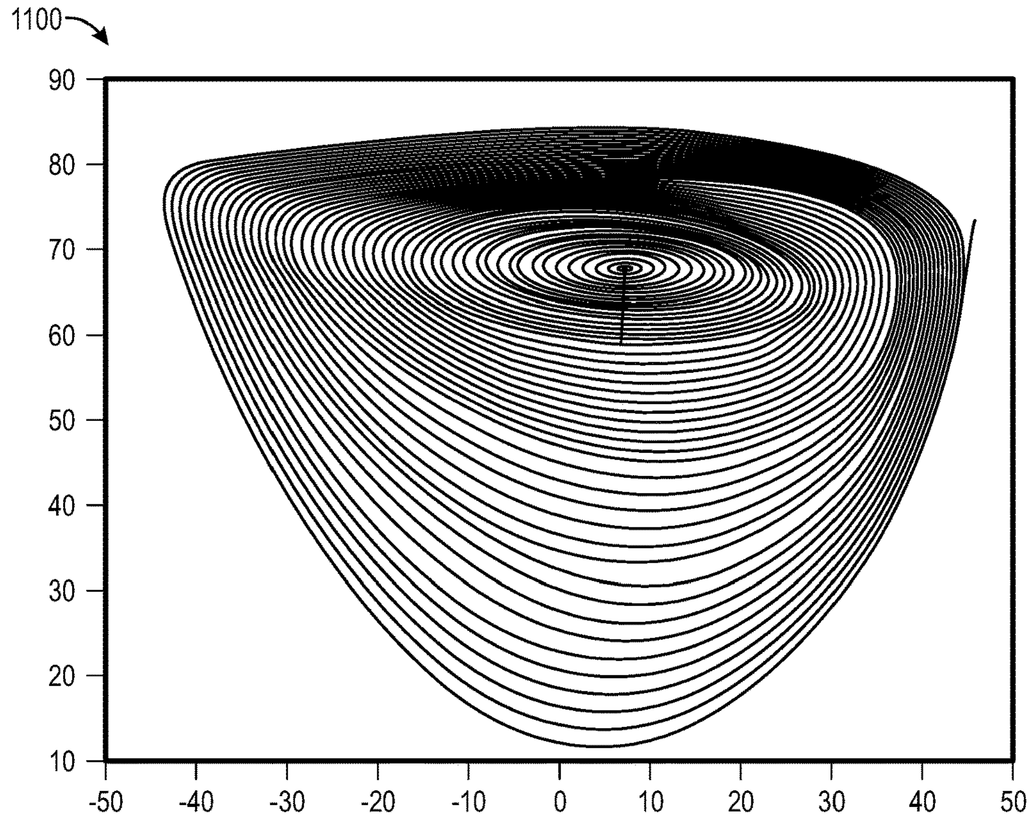
FIGS. 11A and 11B depict alternative scan patterns of the lidar system.
Figure 11B:
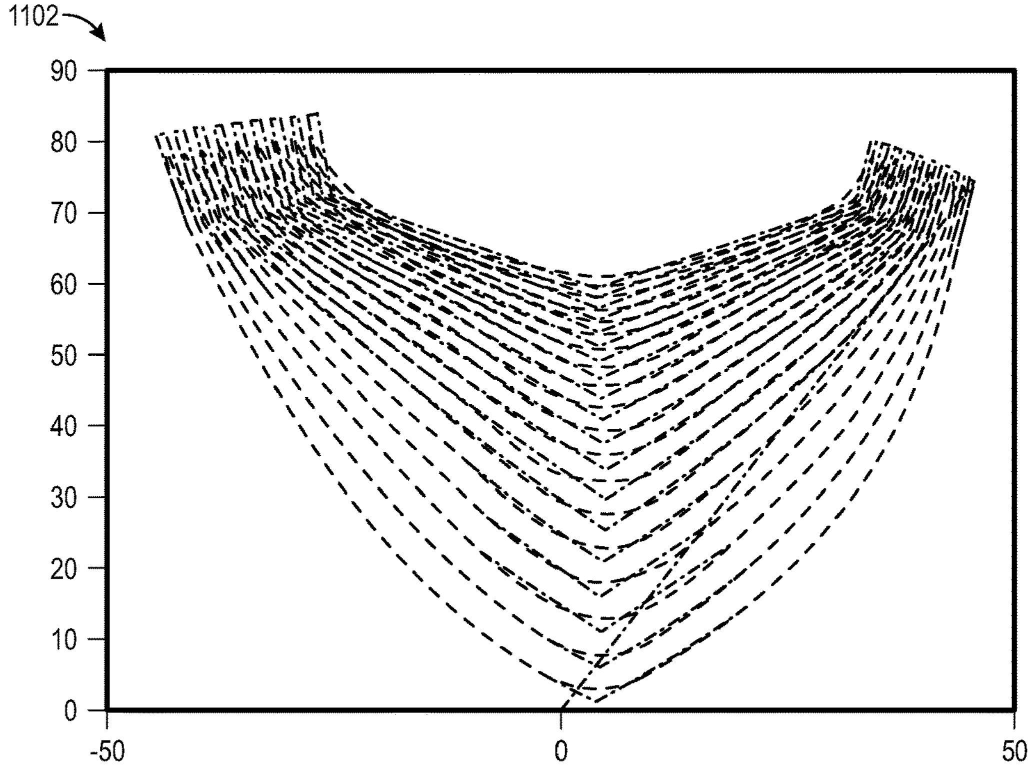

FIG. 10 illustrates a representative field of coverage for lidar sensor system 1000 described in embodiments above viewing a 10 by 10-meter region with boarders 2 meters high at the far edges. The angular field of coverage is shown with a point grid with a separation of 0.6 inches or roughly 0.15 meters. The inverse cosine function can be used to convert the direction cosine values used on the two axes in the figure. In this example a square field of coverage of roughly +/−60 degrees may be used. A raster scan applied to this example may be inefficient, with roughly half of the field unused. FIG. 11A and FIG. 11B illustrate two alternative scan patterns, a modified spiral scan 1100 (FIG. 11A), and a distorted, or curved, raster scan 1102 (FIG. 11B).

In the examples spiral scan 1100 and distorted raster scan 1102, the linear bandwidth of the scanner mirrors may be limited to 400 Hz based on the use of the ST-microelectronics linear mirror as discussed above. The patterns shown may be optimized so that the scan rate decreases as the scan moves upward in elevation in the vertical Y-axis as shown in FIGS. 11A and 11B. As distance increases moving out in the Y axis, the scan rate may decrease to allow more integrated signal returns, improving the receive signal to noise ratio at those generally longer distances. Conversely, at the short distances adjacent to the lidar sensor, the return signals may be high, allowing operation with much fewer integrated pulses. An angular slew rate close to the sensor may be increased by the larger required angle between the desired resolution-based measurement points. The distorted raster scan 1102 may offer an important advantage because the scan retraces at the most distant points of the field of coverage, offering the potential for significantly longer signal integration times due to the time required for the scan velocity to slow to zero and begin a retrace.

Alternative Configurations

Embodiments above describe directly expanding one axis of the square field of coverage using two identical or approximately identical mirrors. While injecting two or more lasers into the horizontal axis is an efficient way to expand coverage, its practicality is reduced once the required scan axis is increased to angles greater than +/−30 degrees. Above that scanning range, scanning efficiency may drop off (output angle deviation in relation to mirror steering angle) resulting in increasing levels of field distortion. To obtain field expansion in one or both axes up to 180 degrees, a field expanding optic can be added after the scanner. The use of an external field expanding optic may be used because the output beam of the transmit scanner 700 appears to originate at a single pivot point rather than shifting in position with horizontal axis rotation.

In embodiments described above it was advantageous to use two identical linear MEMS scanning mirrors in order to provide a relatively low scanning rate in the horizontal axis. In some embodiments, the elongated mirror geometry may not be necessary, but there may be no choice in using the elongated mirror geometry because the elongated mirror geometry may be designed for use as the slower vertical axis mirror when paired with a 1.4 mm diameter resonate mirror discussed in the background section. In some embodiments, a resonate mirror may be used as the first horizontal scanning element with single or multiple beams. Use of a smaller linear actuated MEMS mirror with a higher self-resonance frequency could provide higher bandwidth in one or both axes allowing faster frame coverage and the generation of a more parallel raster scan in the horizontal axis due to the possibility of operating the vertical axis in more of a stepwise fashion.

Although current disclosure has been described with reference to the embodiments illustrated in the attached drawing figures, it is noted that equivalents may be employed, and substitutions made herein without departing from the scope of the disclosure as recited in the claims.

Having thus described various embodiments, what is claimed as new and desired to be protected by Letters Patent includes the following.

The invention claimed is:

1. A lidar transmit scanner comprising:

a catoptric relay assembly comprising an entrance aperture for receiving one or more collimated laser beams, wherein the one or more collimated laser beams are configured along a plane tangent to a line connecting the entrance aperture and an exit aperture and are configured to converge at the entrance aperture; the catoptric relay assembly comprising: the entrance aperture and the exit aperture positioned at decentered symmetrical points from an optical axis and coincident to a single point of rotation; a convex spherical mirror with a radius of curvature within 1% of a distance from a front surface of the convex spherical mirror to the single point of rotation; a concave cylindrical optic located within 1% of the focal length of the convex spherical mirror, between the convex spherical mirror and the single point of rotation, wherein the concave cylindrical optic is produced by revolution of a rectangular cross-section around a first vertical axis crossing through two entrance and exit apertures, wherein the concave cylindrical optic comprises a center reflective stripe oriented along a revolution axis between optically transmissive regions of the concave cylindrical optic; wherein the transmissive regions of the concave cylindrical optic are an integrated correction element; the convex spherical mirror and the concave cylindrical optic comprising centers of curvature approximately coincident to a second single point of rotation along a center axis of the convex spherical mirror and the concave cylindrical optic; a horizontal single axis scanning mirror disposed at the entrance aperture and comprising a mirror rotation axis coincident with a second vertical axis established by an entrance aperture location and an exit aperture location; and a vertical single axis scanning mirror disposed at the exit aperture and comprising a vertical single axis scanning mirror rotation axis orthogonal to said horizontal single axis scanning mirror.

2. The lidar transmit scanner of claim 1, wherein two laser sources are aligned with an angular offset to produce two angularly separate beams substantially along a horizontal axis.

3. The lidar transmit scanner of claim 2, further comprising a first laser source and a second laser source, wherein the first laser source and the second laser source comprise an angular separation roughly equal to an angular beam scanning range of the horizontal single axis scanning mirror to effectively double a horizontal axis angular coverage.

4. The lidar transmit scanner of claim 3, wherein the angular separation between the two laser sources is 30 degrees to provide 60 degrees of the horizontal axis angular coverage.

5. The lidar transmit scanner of claim 1, wherein a laser source comprises: two collimated laser diodes aligned to produce a first laser beam and a second laser beam of the one or more collimated laser beams comprising orthogonal polarization states; and a polarization combining mirror located an intersection of the first laser beam and the second laser beam producing a single output beam with approximately orthogonal combined polarization states.

6. The lidar transmit scanner of claim 5, wherein the two collimated laser diodes are rotated 90 degrees along their optical axis to produce the orthogonal polarization states.

7. The lidar transmit scanner of claim 5, wherein one output of the two collimated laser diodes achieves an orthogonal polarization state using a half-wave polarization retarder plate.

8. The lidar transmit scanner of claim 5, wherein at least one of the two collimated laser diodes comprises a center wavelength between 780 nm and 940 nm.

9. The lidar transmit scanner of claim 8, wherein the center wavelength is between 820 nm and 830 nm.

10. The lidar transmit scanner of claim 1, wherein the horizontal single axis scanning mirror and the vertical single axis scanning mirror are silicon micro-electro-mechanical system (MEMS) mirrors.

11. The lidar transmit scanner of claim 10, wherein scanning mirrors have piezoelectric or electrostatic actuation.

12. The lidar transmit scanner of claim 1, wherein the horizontal single axis scanning mirror and the vertical single axis scanning mirror are operated in a linear mode at least one octave below a first self-resonate frequency of the horizontal single axis scanning mirror and a second self-resonate frequency of the vertical single axis scanning mirror.

13. The lidar transmit scanner of claim 12, wherein the horizontal single axis scanning mirror and the vertical single axis scanning mirror produce a modified spiral scan with an increasing scan rate matched to a decreasing operating distance in elevation.

14. The lidar transmit scanner of claim 12, wherein the horizontal single axis scanning mirror and the vertical single axis scanning mirror produce a curved raster scan with an increasing scan rate matched to a decreasing operating distance in elevation.

15. The lidar transmit scanner of claim 1, further comprising a refractive angular field expansion optic disposed at an output of the vertical single axis scanning mirror.

16. The lidar transmit scanner of claim 15, wherein the refractive angular field expansion optic is anamorphic, providing unequal expansion in two axes.

17. A lidar transmit scanner comprising:

a catoptric relay assembly comprising an entrance aperture for receiving one or more collimated laser beams, wherein the one or more collimated laser beams are configured along a plane tangent to a line connecting the entrance aperture and an exit aperture and are configured to converge at the entrance aperture; the catoptric relay assembly comprising: the entrance aperture and the exit aperture positioned coincident to a single point of rotation; a convex spherical mirror with a radius of curvature within 1% of a distance from a front surface of the convex spherical mirror to the single point of rotation; a concave cylindrical optic located within 1% of the focal length of the convex spherical mirror, between the convex spherical mirror and the single point of rotation, wherein the concave cylindrical optic comprises a center reflective stripe oriented along a revolution axis between optically transmissive regions of the concave cylindrical optic; wherein the transmissive regions of the concave cylindrical optic are an integrated correction element; the convex spherical mirror and the concave cylindrical optic comprising centers of curvature approximately coincident to a second single point of rotation along a center axis of the convex spherical mirror and the concave cylindrical optic; a horizontal single axis scanning mirror disposed at the entrance aperture and comprising a mirror rotation axis coincident with a second vertical axis established by an entrance aperture location and an exit aperture location; and a vertical single axis scanning mirror disposed at the exit aperture and comprising a vertical single axis scanning mirror rotation axis orthogonal to said horizontal single axis scanning mirror.

18. The lidar transmit scanner of claim 17, further comprising: two collimated laser diodes aligned to produce a first laser beam and a second laser beam of the one or more collimated laser beams comprising orthogonal polarization states; and a polarization combining mirror located an intersection of the first laser beam and the second laser beam producing a single output beam with approximately orthogonal combined polarization states.

19. A lidar transmit scanner comprising:

a catoptric relay assembly comprising an entrance aperture for receiving one or more collimated laser beams, wherein the one or more collimated laser beams are configured along a plane tangent to a line connecting the entrance aperture and an exit aperture and are configured to converge at the entrance aperture; the catoptric relay assembly comprising: the entrance aperture and the exit aperture positioned coincident to a single point of rotation; a convex spherical mirror with a radius of curvature within 1% of a distance from a front surface of the convex spherical mirror to the single point of rotation; a concave cylindrical optic located within 1% of the focal length of the convex spherical mirror between the convex spherical mirror and the single point of rotation, wherein the concave cylindrical optic comprises at least one transmissive region and at least one reflective region;

wherein the at least one transmissive region of the concave cylindrical optic is an integrated correction element;

the convex spherical mirror and the concave cylindrical optic comprising centers of curvature approximately coincident to a second single point of rotation along a center axis of the convex spherical mirror and the concave cylindrical optic; a horizontal single axis scanning mirror disposed at the entrance aperture and comprising a mirror rotation axis coincident with a second vertical axis established by an entrance aperture location and an exit aperture location; and a vertical single axis scanning mirror disposed at the exit aperture and comprising a vertical single axis scanning mirror rotation axis orthogonal to said horizontal single axis scanning mirror.

20. The lidar transmit scanner of claim 19, wherein the horizontal single axis scanning mirror and the vertical single axis scanning mirror are silicon micro-electro-mechanical system (MEMS) mirrors.

* * * * *